(12) United States Patent
Stricker et al.

(10) Patent No.: US 10,323,527 B2
(45) Date of Patent: Jun. 18, 2019

(54) BLADE ROW POISITIONING DEVICE, BLADE-DEVICE COMBINATION, METHOD AND TURBOMACHINE

(71) Applicant: MTU Aero Engines AG, Munich (DE)

(72) Inventors: Hans Stricker, Munich (DE); Stefan Rauscher, Aichach (DE); Willem Bokhorst, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 513 days.

(21) Appl. No.: 14/323,446

(22) Filed: Jul. 3, 2014

(65) Prior Publication Data

US 2015/0010396 A1    Jan. 8, 2015

(30) Foreign Application Priority Data

Jun. 24, 2014    (EP) .................................... 14173709

(51) Int. Cl.
*F01D 9/04* (2006.01)
*F01D 25/24* (2006.01)
(Continued)

(52) U.S. Cl.
CPC .............. *F01D 9/042* (2013.01); *B23P 15/04* (2013.01); *F01D 9/00* (2013.01); *F01D 25/246* (2013.01);
(Continued)

(58) Field of Classification Search
CPC .......... F01D 9/042; F01D 5/03; F01D 5/3038; F01D 5/323; F01D 5/326; F01D 25/246; F01D 25/285; F01D 25/243; F01D 25/28; F01D 9/00; F05D 2240/10; F05D 2230/60; F05D 2230/64; B23P 15/04
See application file for complete search history.

(56) References Cited

U.S. PATENT DOCUMENTS 3,067,983 A * 12/1962 Koziura .................. F01D 9/042
                                                              415/209.2
4,053,254 A * 10/1977 Chaplin .................. F01D 11/08
                                                                415/116
(Continued)

FOREIGN PATENT DOCUMENTS

EP    0331837    9/1989
GB    805 545    12/1958

*Primary Examiner* — Jason D Shanske
*Assistant Examiner* — Maxime M Adjagbe
(74) *Attorney, Agent, or Firm* — Davidson, Davidson & Kappel, LLC

(57) ABSTRACT

A device such as a drum for positioning at least one guide blade row from a plurality of guide blade groups in a turbomachine, the device on the outer circumferential side including at least one flange for attachment to a housing section of the turbomachine and on the inner circumferential side including a plurality of uniformly distributed receptacles for accommodating holding elements of the guide blade groups and a plurality of recesses, the device having a depth-reduced inner circumferential section, relative to the accommodating grooves, between at least two adjoining receptacles, which extends in each case from the one receptacle to the other receptacle; a blade-device combination; a method for assembling such a blade-device combination; and a turbomachine.

11 Claims, 3 Drawing Sheets

(51) Int. Cl.
*B23P 15/04* (2006.01)
*F01D 9/00* (2006.01)
*F01D 25/28* (2006.01)

(52) U.S. Cl.
CPC ............. *F01D 25/28* (2013.01); *Y02T 50/671* (2013.01); *Y10T 29/49337* (2015.01)

(56) References Cited

U.S. PATENT DOCUMENTS

| | | | |
|---|---|---|---|
| 4,687,413 A * | 8/1987 | Prario | F01D 11/08 403/319 |
| 4,907,944 A * | 3/1990 | Kroger | F01D 5/3038 415/190 |
| 5,131,813 A * | 7/1992 | Przytulski | F01D 5/03 416/217 |
| 5,232,340 A | 8/1993 | Morgan | |
| 5,411,369 A | 5/1995 | Bouchard | |
| 7,364,402 B2 * | 4/2008 | Brault | F01D 5/027 415/174.5 |
| 8,491,267 B2 * | 7/2013 | Glasspoole | F01D 5/025 416/221 |
| 2011/0097206 A1 * | 4/2011 | Belmonte | F01D 5/026 415/209.2 |

\* cited by examiner

BLADE ROW POISITIONING DEVICE, BLADE-DEVICE COMBINATION, METHOD AND TURBOMACHINE

This claims the benefit of European Patent Application EP 14 173 709.8, filed Jun. 24, 2014 and hereby incorporated by reference herein.

The present invention relates to a device for positioning at least one guide blade row in a turbomachine, to a blade-device combination of a turbomachine, to a method for assembling a blade-device combination, and to a turbomachine.

BACKGROUND

Guide blades in low-pressure turbines of turbomachines are frequently situated successively in multiple rows in a device referred to as a drum, which are fixedly connected on the outer circumference side to a housing section of the low-pressure turbine. The guide blades of one row are preferably combined into guide blade groups, so that multiple guide blades may be simultaneously positioned in the drum. For positioning on the inner circumference side, the drum has a plurality of uniformly distributed receptacles on the inner circumference side for accommodating holding elements of the guide blade groups. The receptacles are conventionally axial grooves, and the holding elements are radially outer axial ribs. To reduce the weight and to optimize the device or the drum from a structural mechanical point of view, a plurality of recesses situated on the inner circumference side, so-called "scallops," are conventionally provided between the axial grooves. However, the recesses favor malpositioning of the guide blade group in the circumferential direction, since these may immerse with their holding elements or ribs into the recesses, and thus a setpoint position of the guide blade groups is feigned. However, during operation an undetected faulty position results in considerable damage in the turbomachine.

SUMMARY OF THE INVENTION

It is an object of the present invention to create a device for positioning at least one guide blade row in a turbomachine, in which faulty positioning of guide blade groups in the circumferential direction is reduced or prevented. Moreover, it is alternative or additional object of the present invention to create a blade-device combination of a turbomachine, whose guide blade groups are positioned at their setpoint positions in the device. Additionally, it is an alternative or additional object of the present invention to create a method for assembling such a blade-device combination and a turbomachine having guide blades which are optimally positioned in a device.

The present invention provides a device for positioning at least one guide blade row in a turbomachine, the guide blade row including guide blade groups which in each case have at least two guide blades and at least two holding elements spaced apart from each other in the circumferential direction for connection to the device, includes on the outer circumference side at least one flange for attachment to a housing section of the turbomachine, and on the inner circumference side a plurality of uniformly distributed receptacles for accommodating the holding elements and a plurality of recesses. According to the present invention, the device has a depth-reduced inner circumferential section, relative to the receptacles, between at least two adjoining receptacles, which extends in each case from the one receptacle to the other receptacle.

The at least one depth-reduced inner circumferential section ensures that the guide blade groups are situated in their setpoint positions. This is due to the fact that malpositioning of subsequent guide blade rows is precluded when the guide blade which is inserted first is aligned on the depth-reduced inner circumference section. However, when one guide blade group is inserted into the device at a distance from at least one depth-reduced inner circumference section and then a subsequent guide blade group runs against the at least one depth-reduced inner circumference section, malpositioning of the guide blades is also precluded in this way. At the same time, requirements in terms of a lightweight construction and structural mechanics are met by the remaining recesses.

In one exemplary embodiment, multiple depth-reduced inner circumference sections are provided, which are situated in the circumferential direction alternatingly with the recesses. In this way, the assembly of the guide blade groups in the device may begin at any arbitrary position since the guide blade group which is inserted first into the device immediately runs against a depth-reduced inner circumference section in the event of malpositioning, regardless of an insertion position on the circumference side. At the same time, requirements in terms of a lightweight construction and structural mechanics continue to be met since the depth-reduced inner circumference sections do not extend between all receptacles, but only between some of the receptacles.

Offset in the axial direction, the device preferably has receptacles, recesses and depth-reduced inner circumference sections for situating multiple guide blade rows successively.

The assembly of the guide blade rows situated successively in the flow direction may be simplified when the depth-reduced inner circumference sections which are offset from each other in the axial direction are almost situated at the same circumferential position.

In one exemplary embodiment, the depth-reduced inner circumference sections have a depth equal to zero (=0) relative to an inside radius of the device from which the receptacles extend radially outwardly. In this exemplary embodiment, the inner circumference sections are designed as recess-free sections, so that an original contouring of the inner circumference of the device may be continued.

A blade-device combination of a turbomachine according to the present invention includes a device according to the present invention which is provided with at least one guide blade row having guide blade groups. Such a blade-device combination includes at least one guide blade row, whose guide blade groups are situated at their circumferential-side setpoint positions. The device is preferably a drum and accommodates multiple guide blade rows successively.

The assembly of the blade-device combination may be simplified when the number of depth-reduced inner circumference sections is smaller than or equal to the number of guide blade groups, since the guide blade groups may thus be inserted into the device at an arbitrary circumferential position and it is immediately detected whether the guide blade group which is presently being inserted is correctly positioned.

In the method according to the present invention for assembling a blade-device combination of a turbomachine, first a device according to the present invention is provided. Then, guide blade groups for forming a guide blade row are provided. Thereafter, the guide blade groups are inserted into the device, the guide blade group which is inserted first being aligned on at least one depth-reduced inner circumference section. As a result of the guide blade group which is inserted first being aligned on at least one depth-reduced inner circumference section, malpositioning of this guide blade group, and thus malpositioning of the following guide blade groups, is prevented since this guide blade group runs against the at least one depth-reduced inner circumference section in the event of malpositioning and thus is not assembleable in the faulty position. When the guide blade group inserted first is then already in a setpoint position, the following guide blade groups are also automatically assembled in their setpoint positions.

A turbomachine according to the present invention includes at least one blade-device combination according to the present invention and is thus characterized by an optimal arrangement of the guide blade rows in the area of the device. The turbomachine is preferably a gas turbine and is situated in particular in the low-pressure turbine of the gas turbine.

BRIEF DESCRIPTION OF THE DRAWINGS

Preferred exemplary embodiments of the present invention are described in greater detail hereafter based on schematic illustrations.

DETAILED DESCRIPTION

Figure 1:
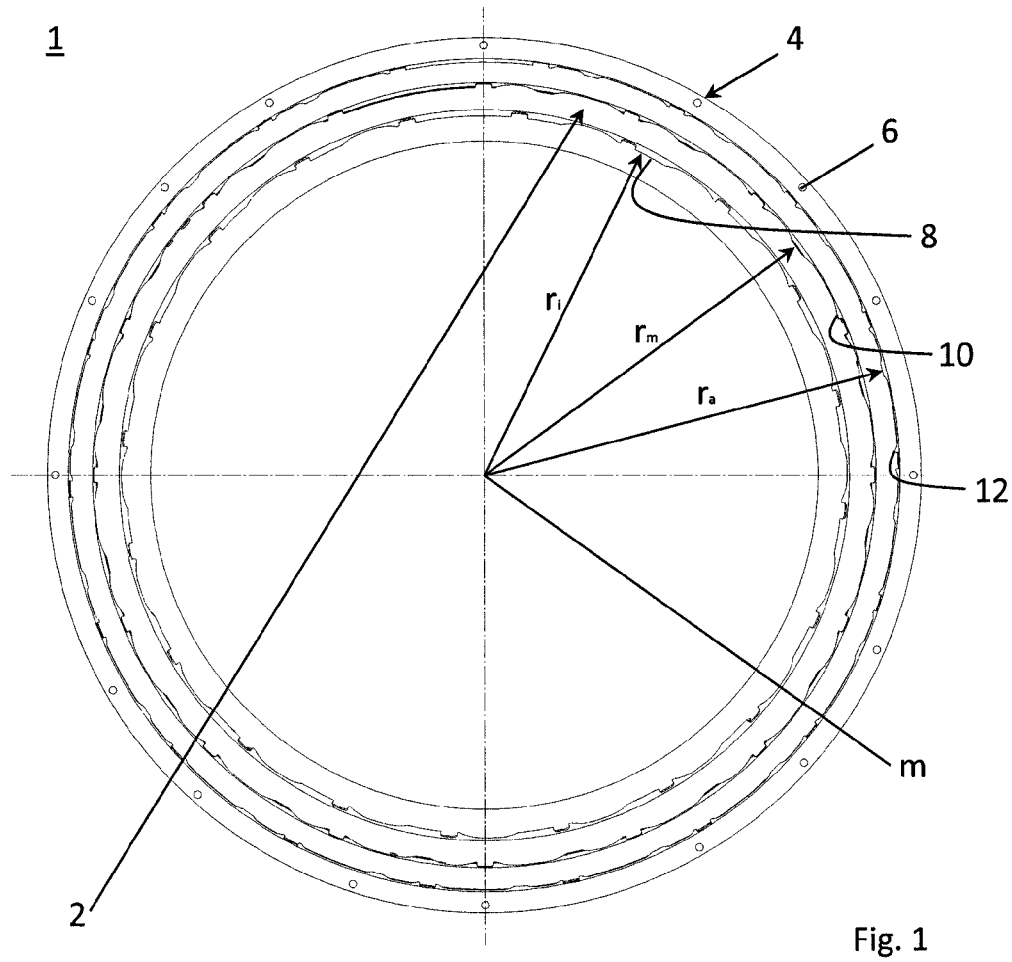
FIG. 1 shows an upstream view of a device according to the present invention.

FIG. 1 shows a rear view of a device 1 for positioning at least one guide blade row in a turbomachine. Rear means that the view of the observer is directed upstream or against the flow direction of a hot gas flowing through the turbomachine. The turbomachine is an aircraft engine, for example, and in particular a gas turbine. Device 1 has a thin-walled, drum-shaped body or a drum 2 which, viewed in the flow direction, is radially or conically widened relative to an axial machine axis m. FIG. 1 thus shows a view into device 1 onto its inner circumference, device 1 radially or conically tapering in the viewing direction. Device 1 is preferably situated in the low-pressure turbine of the turbomachine.

Device 1 is used in a housing section of the turbomachine and for this purpose has a flange ring 4 on the outer circumference side of its drum-shaped body 2, the flange ring having a plurality of attachment ears in each of which an axial bore 6 for leading through a respective attachment screw is formed. In the exemplary embodiment shown here, device 1 is used to accommodate four guide blade rows situated successively in the flow direction. For the sake of clarity, hereafter only three guide blade rows are considered. However, the fourth guide blade row not considered is designed analogously to the three considered guide blade rows.

Due to the radial widening of device 1 in the flow direction relative to a central annular land 10 for accommodating a central guide blade row, a front annular land 8 for accommodating a front guide blade row is situated radially on the inside and a rear annular land 12 for accommodating a rear guide blade row is situated radially on the outside. Annular lands 8, 10, 12 and the guide blade rows are thus situated on different inside radii $r_i$, $r_m$, $r_a$.

Figure 2:
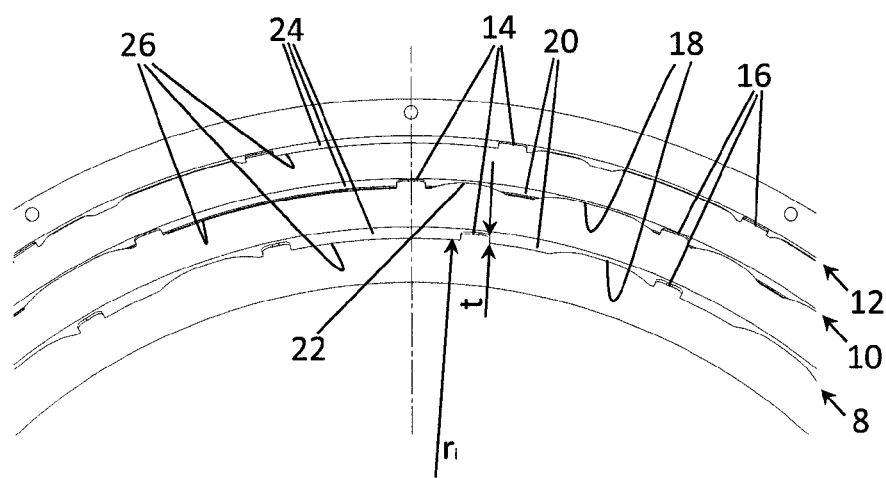
FIG. 2 shows a detailed illustration of the device from FIG. 1.

As is shown in FIG. 2, each annular land, i.e. support ring, 8, 10, 12 has a plurality of uniformly distributed accommodating grooves 14, 16 for fixing the particular guide blade row. Accommodating grooves 14, 16 extend in the axial direction through the particular annular land 8, 10, 12 and are thus open axially and radially on the inside on both sides. In the exemplary embodiment shown here, they have a rectangular cross section having a constant depth t or a radial extension. Depth t is ablated in each case from an annular land inner circumferential surface, which is assigned the particular inside radii $r_i$, $r_m$, $r_a$.

To reduce the weight and/or adjust structural mechanical properties of device 1, at least one recess 18 may be provided between two adjoining accommodating grooves 14, 16, as is illustrated on front annular land 8 and central annular land 10. In the exemplary embodiment shown here, front annular land 8 has a recess 18 and a profile-free section 20 in each case between multiple adjoining accommodating grooves 14, 16. In contrast, central annular land 10 in the exemplary embodiment shown here has two recesses 18, 22 between multiple adjoining accommodating grooves 14, 16, the two recesses being spaced apart from each other via a profile-free or non-contoured section 20. To avoid tension peaks, recesses 18, 22 are concave in the exemplary embodiment shown here, and are thus designed as archings or tub-like contours. Preferably they have a depth which is equal to or even greater than the depth of accommodating grooves 14, 16.

Each annular land 8, 10, 12 includes at least one depth-reduced inner circumference section 24, relative to two adjoining accommodating grooves 14, 16, which extends in each case from one accommodating groove 14 to the other accommodating groove 16. Depth-reduced inner circumference sections 24 of annular lands 8, 10, 12 are almost situated at the same circumferential position and, relative to the particular annular land inner circumferential surface from which accommodating grooves 14, 16 extend radially outwardly, have a depth equal to zero, so that depth-reduced inner circumference sections 24 in the exemplary embodiment shown here are recess-free or trace an original contour of the annular land inner circumferential surface. In the exemplary embodiment shown here, depth-reduced inner circumferential sections 24 thus have a concave surface 26, which is identical to the annular land inner circumferential surface interrupted by accommodating grooves 14, 16 and recesses 18, 22.

Figure 3:
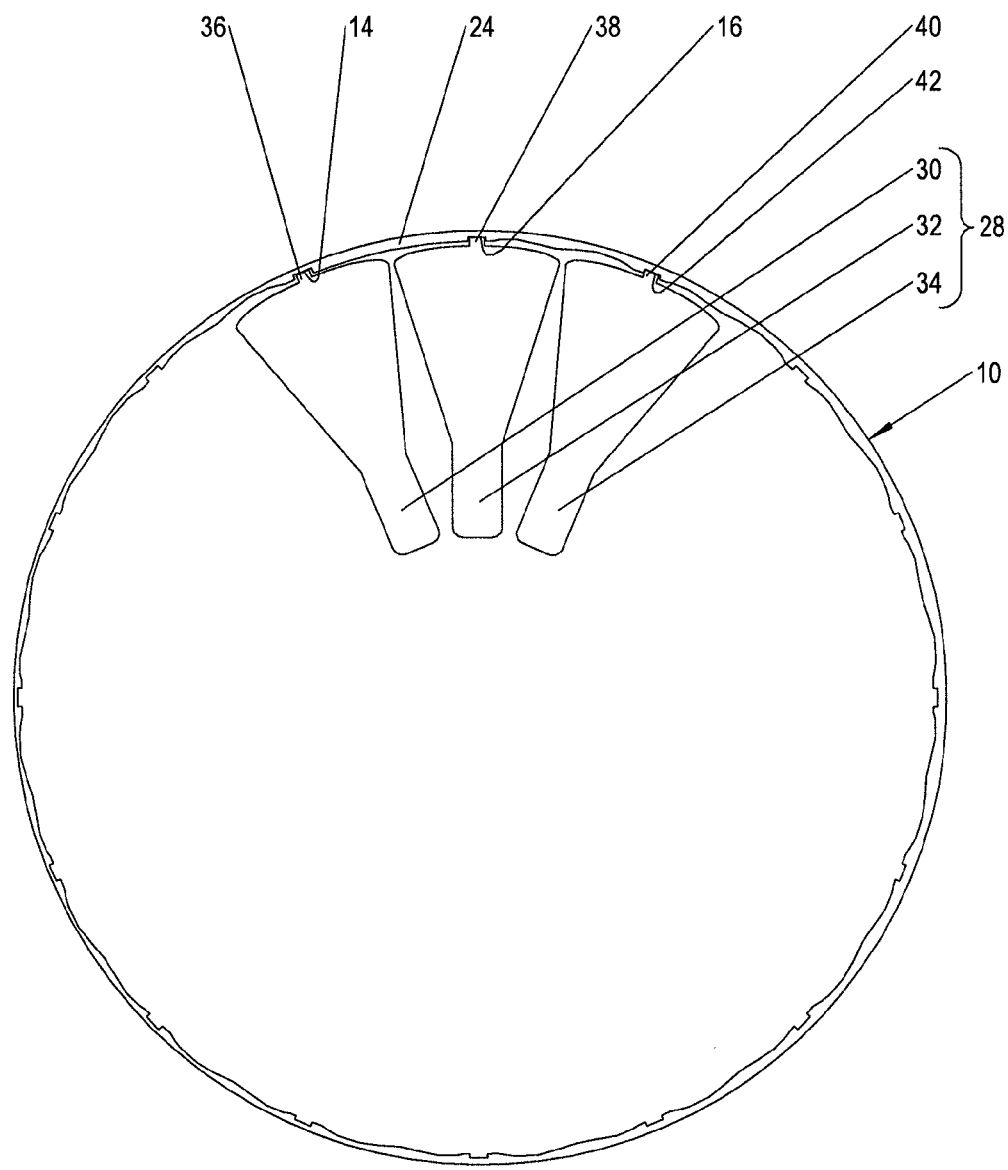
FIG. 3 shows a setpoint positioning of a guide blade group in the device.

As is indicated in FIG. 3 on central annular land 10, each guide blade row includes a plurality of guide blade groups 28, which in turn are composed of a plurality of guide blades 30, 32, 34. In the exemplary embodiment shown here, guide blade group 28 includes three guide blades 30, 32, 34, which in each case are provided with a radially outer holding element 36, 38, 40 for engaging in one of accommodating grooves 14, 16, 42. Of course, only two holding elements 36, 38, 40 are also possible. Holding elements 36, 38, 40 are spaced apart from each other in the circumferential direction and are axial ribs, for example, which cooperate with accommodating grooves 14, 16, 42 in a form-locked manner.

In a method according to the present invention for assembling the blade-device combination indicated in FIG. 3, device 1 is provided first. Then, guide blade groups 28 of the particular guide blade row are provided. Thereafter, guide blade groups 28 are inserted with their holding elements 36, 38, 40 into accommodating grooves 14, 16, 42 of device 1, the guide blade group inserted first being aligned on at least one depth-reduced inner circumference section 24. When at least one of holding elements 36, 38, 40 runs against depth-reduced inner circumference section 24, guide blade group 28 is offset in the circumferential direction and thereby transferred into its setpoint, i.e. desired, position. Thereafter, the next guide blade group is inserted into device 1, the group being aligned on preceding guide blade group 28 and malpositioning being thereby prevented. This is repeated until all guide blade groups 28 of the guide blade row are inserted.

Figure 4:
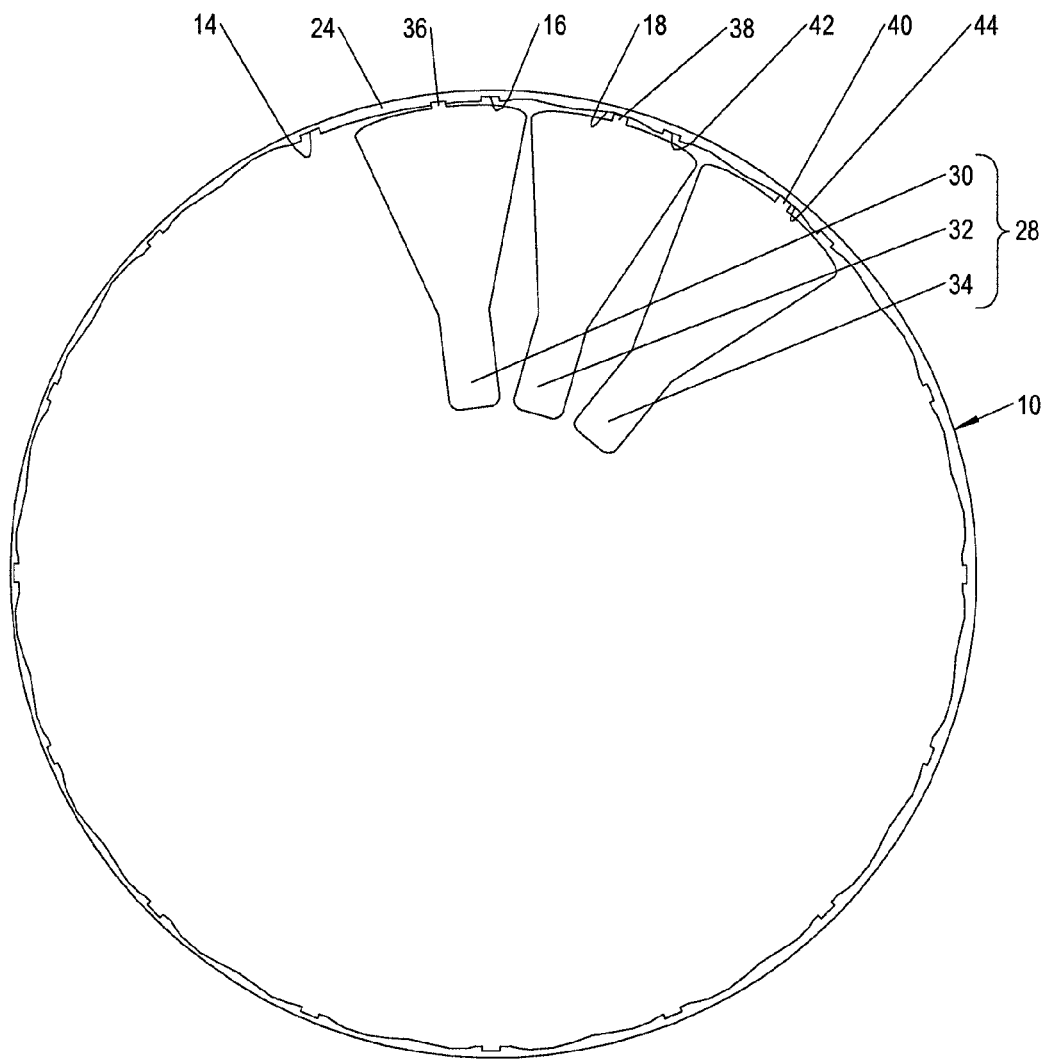
FIG. 4 shows a prevented malpositioning of a guide blade group in the device.

As is shown in FIG. 4, guide blade group 28 is not assembleable since depth-reduced inner circumference section 24 is flatter than accommodating grooves 14, 16, 42. Insertion of guide blade group 28 is prevented by, here left, holding element 36 running against depth-reduced inner circumference section 24. The holding element running against the section thus indicates to an assembler that guide blade group 28 is not in its setpoint position, but in a faulty position on the circumferential side, in which central holding element 38 and right holding element 40 immerse into recesses 18, 44 instead of engaging in accommodating grooves 16, 42. As a result, the assembler offsets guide blade group 28 in the circumferential direction until it is displaceable in the axial direction relative to device 1. According to the illustration of FIG. 3, guide blade group 28 is offset to the left. Guide blade group 28 now engages with its holding elements 36, 38, 40 in each case in one of accommodating grooves 14, 16, 42 and is situated in its setpoint position. Depth-reduced inner circumference section 24 situated between accommodating grooves 14, 16 now does not hinder the assembly since guide blade group 28 is in its setpoint position.

Disclosed is a device such as a drum for positioning at least one guide blade row from a plurality of guide blade groups in a turbomachine, the device on the outer circumferential side including at least one flange for attachment to a housing section of the turbomachine and on the inner circumferential side including a plurality of uniformly distributed receptacles for accommodating holding elements of the guide blade groups and a plurality of recesses, the device having a depth-reduced inner circumferential section, relative to the accommodating grooves, between at least two adjoining receptacles, which extends in each case from the one receptacle to the other receptacle; a blade-device combination; a method for assembling such a blade-device combination; and a turbomachine.

LIST OF REFERENCE NUMERALS 1 device/drum
2 body
4 flange ring
6 axial bore
8 annular land
10 annular land
12 annular land
14 accommodating groove
16 accommodating groove
18 recess
20 profile-free section
16 recess
22 recess
24 depth-reduced inner circumference section
26 surface
28 guide blade group
30 guide blade
32 guide blade
34 guide blade
36 holding element/rib
38 holding element/rib
40 holding element/rib
42 accommodating groove
44 recess
m machine axis
$r_i$ inside radius of front annular land
$r_m$ inside radius of central annular land
$r_a$ inside radius of rear annular land
t depth

What is claimed is:

1. A device for positioning one or more guide blade rows in a turbomachine in a circumferential direction, each of the one or more guide blade rows including guide blade groups, each guide blade group including at least two guide blades and at least two holding elements spaced apart from each other in the circumferential direction for connection to the device, the device comprising:
   at least one flange on an outer circumferential side for attachment to a housing section of the turbomachine and on an inner circumferential side having a plurality of uniformly distributed receptacles for accommodating the holding elements of a guide blade group of a guide blade row of the one or more guide blade rows and a plurality of recesses, each receptacle including a groove that extends in an axial direction, and
   at least one depth-reduced inner circumferential section, relative to the receptacles, between at least two adjoining receptacles of the guide blade row, and extending directly from one of the two adjoining receptacles to the other adjoining receptacle.

2. The device as recited in claim 1 wherein the device is a drum for accommodating multiple guide blade rows successively.

3. The device as recited in claim 1 wherein the at least one depth-reduced inner circumference section comprises a plurality of depth-reduced inner circumference sections situated in the circumferential direction alternatingly with the recesses.

4. The device as recited in claim 1 wherein the at least one depth-reduced inner circumference section comprises a plurality of depth-reduced inner circumference sections, and wherein the receptacles, recesses and depth-reduced inner circumference sections are offset in the axial direction and are formed for situating multiple guide blade rows successively.

5. The device as recited in claim 1 wherein the at least one depth-reduced inner circumference section comprises a plurality of depth-reduced inner circumference sections, and wherein the depth-reduced inner circumference sections offset from each other in the axial direction have a similar circumferential position.

6. The device as recited in claim 1 wherein the at least one depth-reduced inner circumference section has a depth=0 relative to an inside radius of the device from which the receptacles extend radially outwardly.

7. A blade-device combination of a turbomachine, comprising the device as recited in claim 1.

8. The blade-device combination as recited in claim 7 wherein the at least one depth-reduced inner circumference section comprises one or more depth-reduced inner circumference sections, and wherein a number of depth-reduced inner circumference sections is smaller than or equal to the number of guide blade groups.

9. A method for assembling a blade-device combination of a turbomachine, including the following steps:
   providing a device as recited in claim 1;
   providing the guide blade groups; and
   inserting the guide blade groups into the device, the guide blade group inserted first being aligned via the at least one depth-reduced inner circumference section.

10. A turbomachine including a blade-device combination as recited in claim 7.

11. The device as recited in claim 1, wherein each holding element comprises an axial rib receivable in the grooves.

* * * * *